United States Patent [19]

Schneider et al.

[11] Patent Number: 5,620,130
[45] Date of Patent: Apr. 15, 1997

[54] PROCESS FOR PRODUCING A DIE PLATE FOR UNDERWATER GRANULATION OF PLASTIC MATERIAL WITH AN INTERMEDIATE NICKEL ALLOY LAYER

[75] Inventors: Friedrich Schneider, Weissach; Wolfgang Wörz, Illingen, both of Germany

[73] Assignee: Werner & Pfleiderer GmbH, Stuttgart, Germany

[21] Appl. No.: 500,630

[22] Filed: Jul. 11, 1995

[30] Foreign Application Priority Data

Jul. 15, 1994 [DE] Germany .................. 44 25 004.5

[51] Int. Cl.⁶ ............................................ B23K 20/00
[52] U.S. Cl. ................... 228/194; 228/174; 228/262.42
[58] Field of Search ...................... 228/194, 174, 228/262.43, 262.44, 262.42

[56] References Cited

U.S. PATENT DOCUMENTS 3,271,822  9/1966  Rhino ......................... 425/461
3,599,286  8/1971  Karet ........................... 425/464
3,905,743  9/1975  Bagley ......................... 425/464
5,054,682  10/1991  Mistry ......................... 228/194

*Primary Examiner*—Kenneth J. Ramsey
*Attorney, Agent, or Firm*—Ladas & Parry

[57] ABSTRACT

A die plate for the underwater granulation of thermoplastic material is formed with a base plate of an iron alloy, a hard annular cutting plate of titanium-carbide alloy, and an intermediate buffer layer containing nickel between the base plate and the cutting plate to equilibrate heat stresses due to different coefficient of thermal expansion of the base and the cutting plates. The intermediate layer is formed with a thickness of between 0.5 and 2 mm by hot-isostatic pressing a nickel-containing metal powder between the plates such that the intermediate layer is diffusion welded to the plates. Two nickel layers with an intermediate titanium-containing plate can also be formed. Also an ansenitic layer can be formed between the nickel layer and the base plate.

10 Claims, 2 Drawing Sheets

PROCESS FOR PRODUCING A DIE PLATE FOR UNDERWATER GRANULATION OF PLASTIC MATERIAL WITH AN INTERMEDIATE NICKEL ALLOY LAYER

FIELD OF THE INVENTION

The invention relates to a process for producing a die plate for the underwater granulation of plastic material in which an intermediate layer is interposed between a base plate and an annular cutting plate.

The invention further relates to the die plate produced by this process.

BACKGROUND AND PRIOR ART

The underwater granulation of thermoplastic materials is conducted by cutting strands of the plastic material exiting from the openings of bores in the die plate with cutting knives acting on the cutting surface of the die plate under compressive pressure. Metal materials containing carbide particles of a size of less than 10μ and a volume of more than 50% are known for forming the cutting surface of the die plate. However, these hard material alloys have a low coefficient of heat expansion which is a disadvantage when compared with iron-based alloys, for example, with a martensitic structure. The stresses that arise between the interfaces of the materials lead to formation of stress cracks in the materials and thus to formation of plastic granulate of lower quality and to premature breakdown of the materials.

In U.S. Pat. No. 3,271,822, shaped pieces of sintered tungsten carbide are introduced into a recess in the die plate. These pieces are separated from each other and from the die plate by thin metal strips of silver and copper and are securely soldered under vacuum, so that the gaps between the shaped pieces are filled.

This insertion of individual shaped pieces into the die plate is not permanent due to the wear of the gaps filled with the silver solder whereupon these then act as expansion gaps, as washouts of the expansion gap occur after a certain amount of time. This has a considerable adverse effect on the cutting process of the plastic strands. It leads to nonuniform and "burned" granulate at the output or cutting surface of the cutting plate.

In another die plate disclosed in U.S. Pat. No. 3,599,286, the cutting surface is provided with several ceramic layers and thin metal strips are placed between and combined with the ceramic layers by flame spraying, these strips sealing the die plate openings and forming a heat insulation in a sandwich-type structure. The upper ceramic layer forming the cutting surface of the cutting plate is in danger of breaking due to its brittleness, since heat stresses, caused by the cooling effect of the granulating water or by the input of heat resulting above the dies, are not intercepted. This also leads to expansion cracks in the cutting surface.

SUMMARY OF THE INVENTION

An object of the invention is to provide for the production of a die plate in which a cutting plate is secured to a base plate without gaps and free from the effect of harmful heat stresses.

A further object of the invention is to provide a die plate produced in this way.

In order to achieve the above objects, the invention provides for the forming of an intermediate layer between the base plate and the cutting plate by hot isostatic compression of a metal powder mixture containing nickel to achieve diffusion bonding of the intermediate layer to the base plate and to the cutting plate.

The nickel-containing intermediate layer serves as a buffer layer and makes possible an equilibration of heat stresses between the base plate and the cutting plate due to a high elongation at rupture of $\Sigma > 30\%$. Accordingly, the different longitudinal expansions between the hot base plate and the cooled cutting plate will be completely taken up by the intermediate layer, and the cutting plate can be formed with a solid cutting surface, without gaps.

In addition, a compressive pre-stress in the cutting plate in the operating state can be obtained by the hot-isostatic compression technique, as is known in and of itself; this compressive pre-stress remains under the operating conditions. Since this compressive pre-stress remains and is superimposed during the cooling process after the hot-isostatic pressing process from approximately 1300° C. to room temperature, no tensile stresses occur in the operating state. Thereby any danger of fracture of the brittle cutting plate, which contains a large amount of carbide, is prevented.

If the intermediate layer consists of a metal-powder mixture containing a large amount of nickel, a high coefficient of thermal expansion of approximately $14 \times 10^{-6}$ m/m °K is possible at 300° C., so that remaining small residual stresses are easily taken up due to the low yield point. An intermediate layer containing a large amount of nickel also offers the advantage of a very good heat distribution, which is especially beneficial in particular cases, such as obtaining uniform flow even with highly viscous plastic melts.

In another advantageous embodiment of the invention, the intermediate layer consists of an austenitic alloy and compressive pre-stress is obtained to an increased extent by the hot-isostatic pressing process, due to this material's high coefficient of expansion at 300° C. of up to $18 \times 10^{-6}$ m/m °K, whereby tensile stresses are not produced by heat expansion in the operating state. This reduces any danger of fracture of the brittle cutting plate containing a large amount of carbide, which cannot resist tensile stresses.

The advantages of a heat insulation are achieved, in addition to a uniform heat distribution and in addition to the advantages of an effective stress equilibration between the cutting plate and the die plate, by forming the intermediate layer as a combination of several layers.

Austenitic alloys, such as titanium alloys have proven particularly suitable for this purpose, particularly as a heat-insulating buffer layer.

By embedding the titanium alloy between nickel alloy layers, there is obtained the advantages of a high intrinsic stability with a particularly good heat distribution in the region of the calibrated bores for the formation of the plastic strands. In addition, different heat expansions are taken up in an increased manner by the layers present in combination.

DETAILED DESCRIPTION

Figure 1:
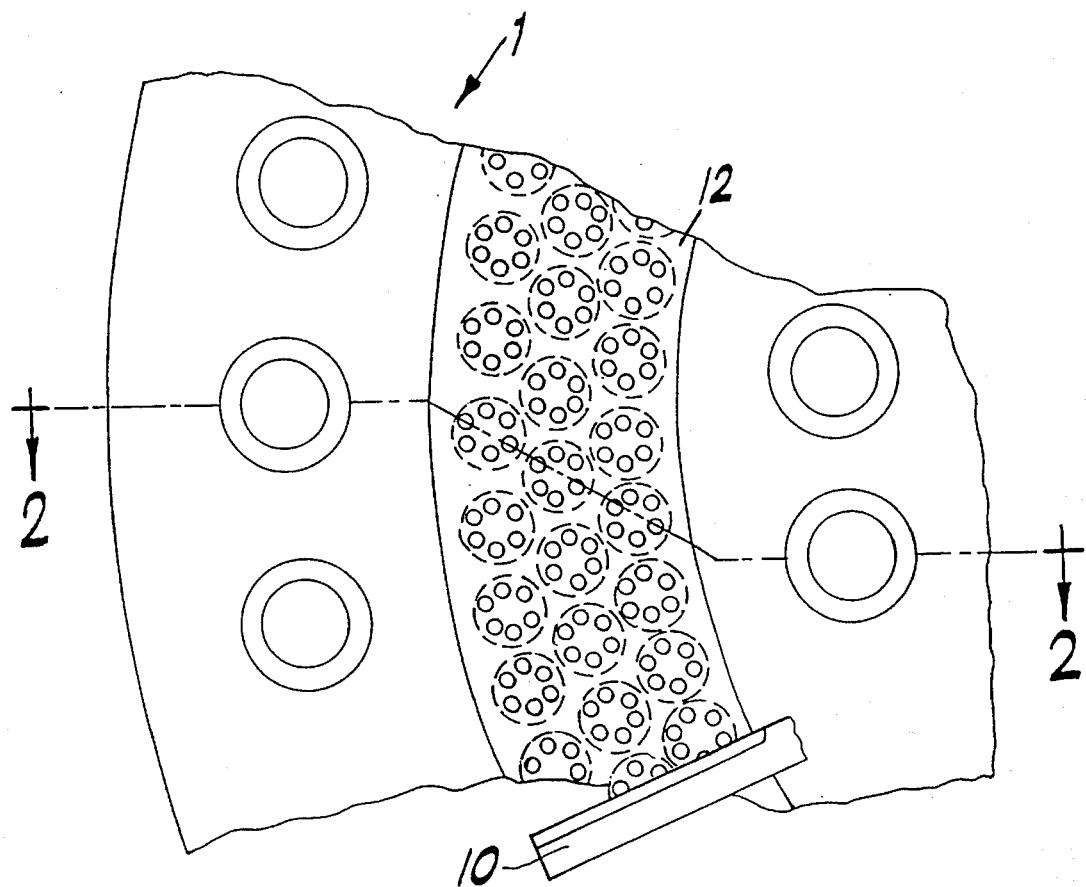
FIG. 1 is a front view of a portion of a die plate.
Figure 2:
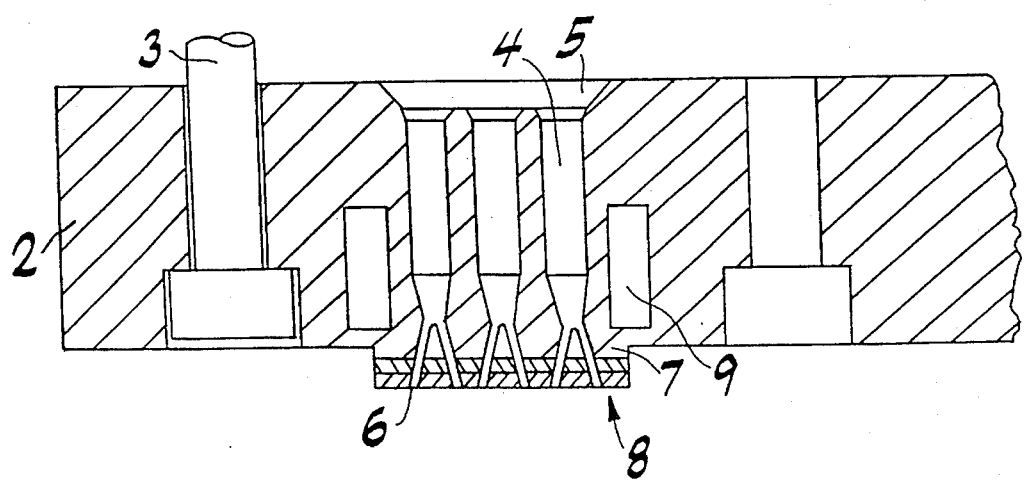
FIG. 2 is a sectional view taken along line 2—2 in FIG. 1.

FIGS. 1 and 2 show a portion of a die plate 1 for the underwater granulation of thermoplastic materials which comprises a base plate 2 rigidly secured by bolts 3 to the outlet end of an extruder (not shown), in which a plastic melt is processed.

The base plate 2 is formed from a corrosion-resistant material, for example, chromium steel, containing 13% Cr by volume so that the base plate can be machined. Calibrated bores 6 are formed in the base plate and communicate with feed channels 4 extending from an annular inlet channel 5 which receives plastic melt from the extruder. The bores 6 extend into an annular projection of the base plate. The bores 6 are illustrated as being arranged in a circle, but other arrangements are also conceivable. Heating channels 9, which convey a heat medium, such as steam serve to supply heat to the plastic material in feed channels 4 particularly at their transition connection to bores 6. The die plate 1 has an outer cutting surface 8 acted on under a slight compressive pressure by cutting knives 10 of a cutting unit. The outer cutting surface 8 of the die plate is cooled by the surrounding water in which the die plate is immersed. The plastic strands discharged from bores 6 are cut into granules by cutting knives 10 and drop into the surrounding water.

In order to be able to granulate the plastic material with a long service life, a cutting plate 12 forms the outer surface of the die plate and resists the compressive pressure of the cutting knives 10. The cutting plate 12 is formed substantially of a hard carbide-containing material.

Such hard material alloys have a relatively low coefficient of thermal expansion which is a disadvantage when compared with the relatively high coefficient of thermal expansion of the iron-based alloys which form the base plate 2 of the die plate 1.

In order to counteract the disadvantageous consequences resulting from the differences of thermal expansion of the base plate 2 and cutting plate 12, an intermediate layer 13 formed from a metal powder mixture containing nickel is interposed between the base plate 2 and the cutting plate 12. This interposition of the intermediate layer is obtained by hot isostatic pressing under pressure and elevated temperature, whereupon the isotropic structure of the metal powder mixture of the resultant intermediate layer 13 is combined by diffusion welding with the cutting plate 12 and the base plate 2.

The hot isostatic pressing process is known in and of itself. It has been found surprisingly that by applying it and by using a relatively thin intermediate layer, of a thickness between 0.5 and 2 mm, containing nickel, a ductile buffer layer is created between the base plate 2 and the cutting plate 12, which makes possible an excellent equilibration of the different heat expansion properties of base plate 2 and die plate 12.

The metal powder mixture is advantageously comprised of the following ingredients in % by weight.

98.62 Ni, 0.02 C, 0.35 Mn, 0.40 Fe, 0.01 S, 0.35 Si, 0.25 Cu.

The cutting plate 12 advantageously consists of a hard material with a titanium carbide content between 25 and 35% by weight in a corrosion-resistant binder phase and is available as Nicro 128 from the Thyssen Company.

If the intermediate layer 13 consists of an alloy with a very high nickel fraction, i.e., more than 90% by weight, an optimal distribution of heat from heat channels 9 to bores 6 is obtained, predominantly by the high heat conductivity of the intermediate layer 13, so that overall a uniform flow of the plastic melt in bores 6 is achieved.

Figure 3:
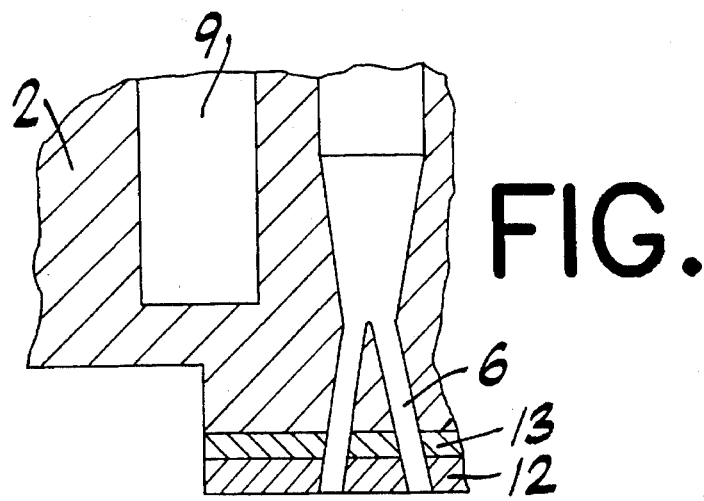
FIG. 3 shows a portion of FIG. 2 on an enlarged scale.
Figure 4:
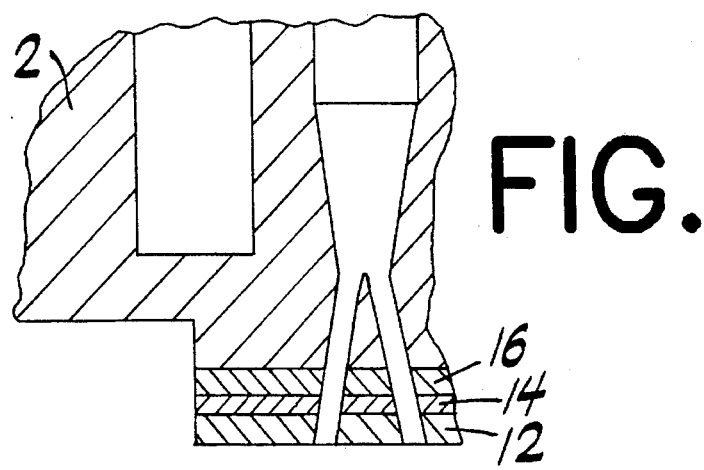
FIGS. 4 and 5 are similar to FIG. 3 but show further embodiments according to the invention.

FIG. 4 snows a construction of the intermediate layer as two layers, according to which base plate 2 is combined with an austenitic alloy 16 whose nickel content is between 8 and 15% by weight, whereas cutting plate 12 is joined with a high content, nickel alloy layer 11 with a high nickel content similar to layer 13 in FIG. 3. In this way, austenitic alloy 16 layer reduces heat losses from die plate 1 to the granulating water, whereas alloy layer 11 with its high nickel content again makes possible a uniform heat distribution between the bores 6. The layers 11 and 16 each have a thickness of between 0.5 and 2 mm.

Figure 5:
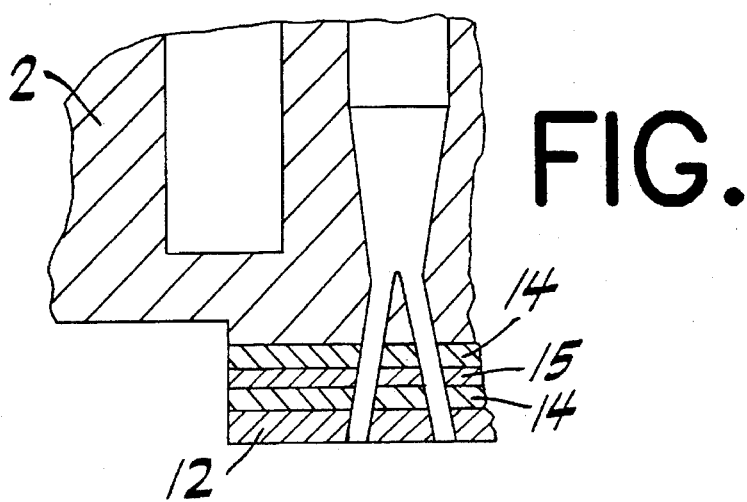

Further, as shown in FIG. 5 the intermediate layer can be advantageously formed from three individual layers of metal powder mixtures. In this way, two alloy layers 14, similar to layer 13 in FIG. 2, contain a large amount of nickel and enclose a titanium alloy layer 15 therebetween. The layers 14 and 15 each have a thickness of between 0.5 and 2 mm.

The alloy layers 14 in FIG. 5 and the layer 11 in FIG. 5 contain a nickel fraction of more than 90% by weight.

The high insulation capacity of the titanium alloy layer 15, containing 90% titanium by weight, between the alloy layers 14 serves particularly for heat insulation of base plate 2.

The disadvantageously small elongation at rupture of the titanium alloy is no longer harmful, since it is embedded between the two ductile buffer layers 14 of high elongation at rupture.

The procedure makes possible the formation of a cutting surface 8 of cutting plate 12 as a solid surface, with the advantages of a high intrinsic stability and excellent heat distribution in the region of the calibrated bores 6 for the plastic strands since variable wear does not occur on the cutting surface.

Although the invention has been described in relation to specific embodiments thereof, it will become apparent to those skilled in the art that numerous modifications and variations can be made without departing from the scope and spirit of the invention as defined in the attached claims.

What is claimed is:

1. A process for forming a die plate for underwater granulation of plastic material comprising:
   providing a base plate,
   providing an annular cutting plate in facing relation to said base plate, and
   forming an intermediate layer between and joining said base plate and said annular cutting plate by hot-isostatic compression of a metal powder mixture containing nickel to diffusion bond the intermediate layer to said base plate and to said annular cutting plate.

2. A process as claimed in claim 1, comprising forming said intermediate layer with a thickness between 0.5 and 2 mm.

3. A process as claimed in claim 2, comprising providing bores in said intermediate layer and said cutting plate which communicate with feed channels for plastic material in said base plate such that the plastic material will be discharged as strands from the bores at an outer cutting surface of said cutting plate.

4. A process as claimed in claim 3, wherein the nickel is the predominant fraction in said powder material.

5. A process as claimed in claim 4, wherein said nickel is present in an amount of at least 90% by weight.

6. A process as claimed in claim 1, wherein said intermediate layer is formed as an austenitic alloy with a nickel fraction of 8 to 15% by weight.

7. A process as claimed in claim 1, wherein said intermediate layer is formed by first and second integrated layers, the first layer being diffusion bonded to said base plate and being formed as an austenitic alloy containing nickel, the second layer being diffusion bonded to said cutting plate and being formed as an alloy containing nickel in an amount of at least 90% by weight.

8. A process as claimed in claim 7, wherein each of said first and second layers is formed with a thickness of between 0.5 and 2 mm.

9. A process as claimed in claim 1, wherein said intermediate layer is formed by first, second and third layers, the first and third layers being respectively diffusion bonded to said base plate and said cutting plate and being formed as an alloy containing nickel in an amount of at least 90% by weight, the second layer being formed as an alloy containing titanium in an amount of at least 90% by weight.

10. A process as claimed in claim 9, wherein each of said first, second and third layers is formed with a thickness of between 0.5 and 2 mm.

* * * * *